United States Patent
Reisz

(10) Patent No.: US 8,332,407 B2
(45) Date of Patent: Dec. 11, 2012

(54) METHOD FOR BUNDLING OF PRODUCT OPTIONS USING HISTORICAL CUSTOMER CHOICE DATA

(75) Inventor: Claudia Reisz, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 12/052,995

(22) Filed: Mar. 21, 2008

(65) Prior Publication Data

US 2009/0055244 A1    Feb. 26, 2009

Related U.S. Application Data

(63) Continuation of application No. 11/417,118, filed on May 4, 2006, now abandoned.

(51) Int. Cl.
*G06F 17/00* (2006.01)

(52) U.S. Cl. ....... 707/737; 707/948; 707/949; 705/7.31; 705/14.62

(58) Field of Classification Search .......... 707/737, 707/948, 949; 705/7.39, 14.62
See application file for complete search history.

(56) References Cited

U.S. PATENT DOCUMENTS

| | | | |
|---|---|---|---|
| 5,754,939 A * | 5/1998 | Herz et al. .................. | 455/3.04 |
| 5,758,257 A | 5/1998 | Herz et al. | |
| 5,918,217 A | 6/1999 | Maggioncalda et al. | |
| 6,397,212 B1 * | 5/2002 | Biffar .......................... | 707/704 |
| 7,222,085 B2 | 5/2007 | Stack | |
| 7,249,052 B2 | 7/2007 | Himes | |
| 2001/0051932 A1 * | 12/2001 | Srinivasan et al. ........... | 705/400 |
| 2002/0128910 A1 * | 9/2002 | Sakuma ........................ | 705/14 |
| 2003/0023513 A1 * | 1/2003 | Festa et al. ..................... | 705/27 |
| 2003/0059818 A1 | 3/2003 | Domany et al. | |
| 2003/0065635 A1 | 4/2003 | Sahami et al. | |
| 2005/0240563 A1 | 10/2005 | Domany et al. | |
| 2005/0278324 A1 | 12/2005 | Fan et al. | |
| 2006/0136589 A1 | 6/2006 | Konig et al. | |
| 2007/0094067 A1 | 4/2007 | Kumar et al. | |
| 2008/0015910 A1 | 1/2008 | Reisz et al. | |

OTHER PUBLICATIONS

NYU IT Sevices, "pcAnywhere: Setting it up for Secure Communications", Dec. 2002, pp. 1-8.
ESRI, "Cluster Analysis Tool", http://edndoc.esri.com/arcobjoects/8.3/Samples/Analysis%20and%20Visualization/Cluster%20Analysis/CLU...",Jun. 24, 2002, pp. 1-7.
Benabdeslem et al., "Dendogram-based SVM for Multi-Class Classification", Apr. 2006, Journal of Computin and Information Technology, pp. 283-289.
Rohm et al, "A typology of online shoppers based on shopping motiviations", Jul. 2004, Journal of Business Research, pp. 748-757.

(Continued)

*Primary Examiner* — Cheyne Ly
(74) *Attorney, Agent, or Firm* — Whitham, Curtis, Christofferson & Cook, P.C.; Daniel P. Morris

(57) ABSTRACT

A method and system for customer-choice-based bundling of product options collects data from previous orders about customer component choices, computes a pairwise distance between any pair of components that capture how much the probability of a choice pair P(a.b) deviates from the expected probability under the null hypothesis of independence P(a)*P(b), and clusters the components. The methodology can be implemented as instructions implemented in a computer readable medium. In this way, the need for a method to permit bundles of product options to be configured through the use of business processes reflecting choices based on the preferences of customers rather than the preferences of product designers is fulfilled.

17 Claims, 5 Drawing Sheets

OTHER PUBLICATIONS

Majone et al, "Distance-based cluster anlysis and mesurement scales", Oct. 2004, pp. 153-164.

Collins English Dictionary, Definition of Dendrogram, Dec. 2000, Harper Collins, p. 1.

OED.com, Def. of "dendrogram", Dec. 1989, Oxford University Press, p. 1.

Berry et al, "Factory Focus: Segmenting Markets from an Operations Perspective", Aug. 1991, Journal of Operations Mangaement, Special Issure on Linking Formulation, vol. 10, No. 3, pp. 363-387.

Deshpande, et.a., "Item-Based Top-N Recommendation Algorithms", ACM Transactions on Information Systems, Jan. 2204, vol. 22, No. 1, p. 143-177.

Greene et al, "User's Guide to BUNDOPT(tm) for Window v. 1.01: A Model for Optimal Custer Reach and Market Segmentation", p. 1-45, xx/xx/1999.

Marion et al, A tale of two markets:employer expectations of information professional in Australia and the United States of America. World Library and Information Congress: 71th IFLA Gerneral Conference and Council, Jun. 7, 2005, pp. 1-16.

* cited by examiner

METHOD FOR BUNDLING OF PRODUCT OPTIONS USING HISTORICAL CUSTOMER CHOICE DATA

This application is a continuation of U.S. patent application Ser. No. 11/417,118, filed May 4, 2006, now abandoned and which is incorporated herein by reference.

BACKGROUND OF THE INVENTION

1. Field of the Invention

The present invention relates to the field of producing and marketing non-standardized goods.

2. Background Description

Mass-produced goods tend to be highly standardized in order to maximize manufacturing efficiencies. Those efficiencies include, but are not limited to, cost savings from long production runs and the reduction of so-called "set up time" required to change an assembly line over from one configuration to another. Some goods, however, are not as standardized; instead, for certain goods, each item may be configured to meet the requirements of its intended purchaser. In classic "one off" goods, such as bespoke suits or commissioned furniture, unique one-of-a-kind items may be designed on the basis of customer interviews conducted by the individual craftsman who will make the item. In general, the prevalence of unique "one off" products appears to have been in continual decline (relative to the number of highly standardized, mass-produced products) since the development and large-scale implementation of mass production. This is in part attributable to the fact that a high degree of customization undercuts efficiencies that come from the use of mass production techniques.

The persistence of non-standardized goods may be explained by the fact that, even though a high degree of standardization may contribute to efficient mass production, some types of products do not lend themselves to complete standardization. By way of example and not limitation, trucks are typically sold with a broad range of options. In the United States, truck options may even include the availability of alternative engines from different engine manufacturers for use on a single model of truck. This is done to accommodate customer preferences which may be based on efficiency considerations relevant to the customer's business. For example, a customer that has already acquired tools and technical expertise for the purpose of maintaining a particular make of truck engine may not consider the acquisition of a new truck unless it has the same make of engine. (In the United States, not all truck engine manufacturers make trucks and not all truck manufacturers make engines.) Similarly, a customer that typically uses a truck for long-haul purposes is likely to require optional "sleeper cab" facilities that a customer using the same type of truck for local hauling would not be willing to pay for. In addition, requirements for safety and handling options relevant to various types of road and weather conditions may differ from customer to customer.

Thus, notwithstanding the efficiencies available from mass production techniques, there are still products (including, but not limited to, trucks) which must be customized, at least to an extent, because of customer-specific requirements that differ from end user to end user.

In order to optimize the tradeoffs between maximizing production efficiencies while at the same time making products that meet the individualized requirements of particular customers, manufacturers have developed techniques of combining options into bundles so that batches of similarly customized products may be made together, rather than making each customized product individually. Existing approaches to developing such bundles, however, have been driven by the choices of product designers and have not afforded a systematic way of incorporating customer preference data. Product designers do not appear to have had access to an effective way to group product options into customer-choice-based bundles.

SUMMARY OF THE INVENTION

There is thus a need for a way to permit product option bundles to be configured through the use of business processes reflecting choices based on the preferences of customers rather than the preferences of product designers. The present invention makes it possible to identify groups of components that exhibit strong customer-choice interdependencies. Sets of optional product components are combined into bundles, with each bundle (e.g., an all-weather package) comprising a group of possible options found to be significantly interdependent in terms of customer choice data. Bundling choices across multiple product components simplifies the product configuration process—both for the customer and for the manufacturer—and can also translate into increased production efficiency by increased standardization.

Starting from existing data on customer configuration choices (e.g., data recorded of previous order), in one embodiment, the present invention uses a distance measure (chi-square, mutual information, etc.) that can capture the notion of interdependence between any two pairs of components with any number of options. To assess the interdependence of choices, we compute from the customer data all probabilities of customers choosing a particular option $P(O)$ (e.g., probability of ordering a RED truck) and all probabilities of pairs of options $P(Oj,Ok)$ (e.g., probability of ordering a RED truck with GREEN upholstery). The independence of two components (e.g., truck color and upholstery color) is measured by comparing the actual probability of all choice pairs $P(a.b)$ for the two components with the expected probability of observing this choice pair if they were totally unrelated $P(a)*P(b)$. There are various mathematical ways of comparing those two probabilities (difference, ratio, . . . ) and combining them for all possible combinations of options for a pair of components (e.g., the sum of squared differences leading to a chi-squared).

Using any of the possible methods to estimate the pairwise independence, the invention constructs a distance matrix that for any two components contains the numerical value for the degree of independence. The present invention employs a clustering approach that iteratively groups pairs of component groups together if they exhibit strong choice interdependence as revealed by the distance measure. The resulting component groups are identified as potential component bundles.

A producer of a complex non-standardized good may offer a number of different options for different components. The customer constructs his preferred configuration depending on the intended use of the product by choosing one of the available options for each component. The present invention allows the identification of groups of components that exhibit strong customer-choice inter-dependencies. The configuration and production of complex multi-component products, bundling the choices across multiple product components, simplifies marketing and the customer-configuration process.

Thus, one embodiment of the present invention offers a process of recording customer choices for product components, clustering components based on the customer choices, and bundling components based on clusters. An embodiment of the present invention (as shown, for exemplary purposes, in detailed steps in FIG. 1): collects data from previous orders about customer component choices; computes a pairwise distance between any pair of components to capture how much the probability of a choice pair P(a.b) deviates from the expected probability under the null hypothesis of independence P(a)*P(b) (e.g., the sum of squared differences leading to a chi-squared or mutual information); and clusters the components and (e.g., through a hierarchical clustering as shown, for exemplary purposes, in FIGS. 2 and 3)

BRIEF DESCRIPTION OF THE DRAWINGS

The foregoing and other objects, aspects and advantages will be better understood from the following detailed description of preferred embodiments of the invention with reference to the drawings.

DETAILED DESCRIPTION OF A PREFERRED EMBODIMENT OF THE INVENTION

Figure 1:
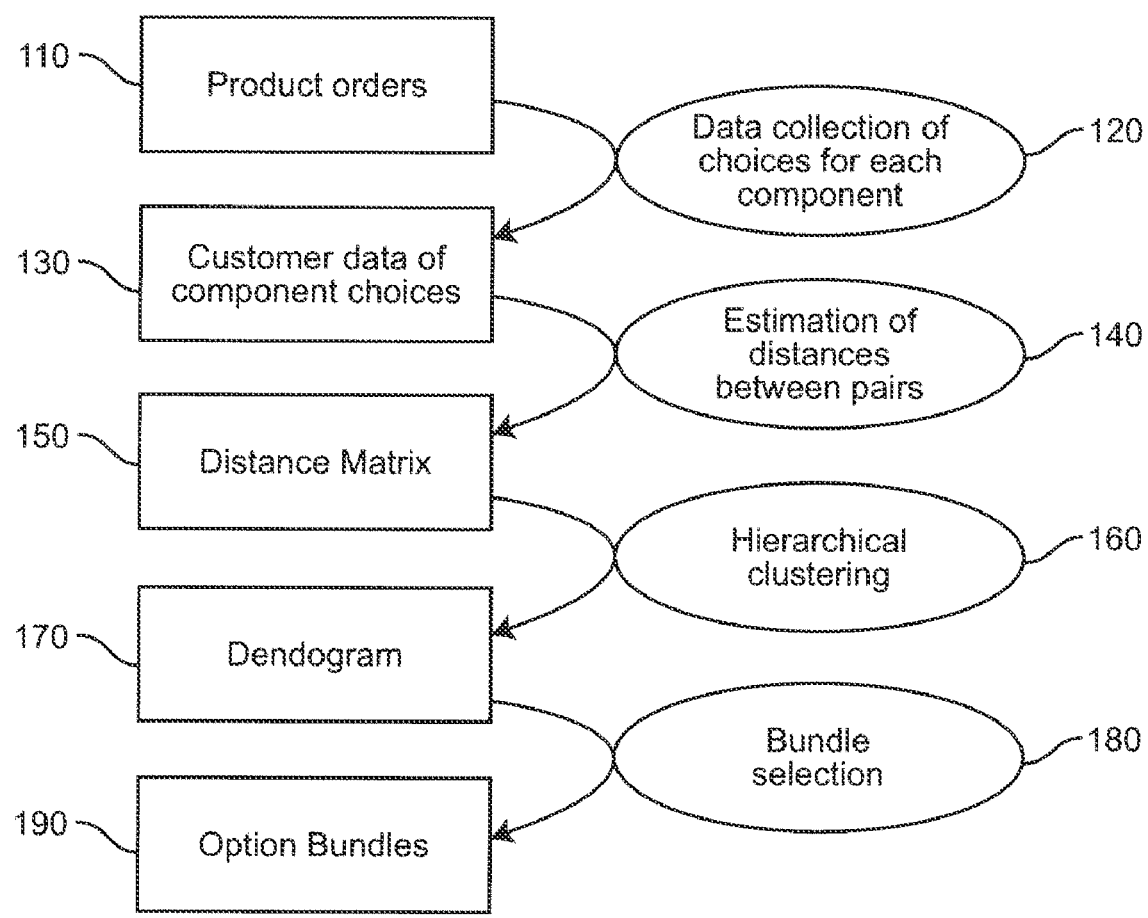
FIG. 1 is a representation of the stepwise outline of the business process of the present invention.

In a preferred embodiment, a method includes the steps of collecting data from previous orders about customer choices for all components, computing a pair wise distance between any pair of components that capture how much the probability of choice pair P(a,b) deviates from the expected probability under the null hypothesis of independence P(a)*P(b), and clustering the components, including but not limited to the use of a hierarchical clustering as shown in FIG. 1.

A product is defined as a set of choices P={C1, . . . , Cn} where $Ck \in \{O1, \ldots, Ok\_max\}$. Product configurations are observed for m customers P1, . . . , Pm. There is defined a distance D: $Cm \times Cm \rightarrow R$ which captures dependence between the two components based on choices. Examples of such distances are:
  Chi-squared divergence of expected probabilities and actual probabilities,
  Mutual Information, and
  Normalized Mutual Information (accounting for effect of varying k_max).
Hierarchical clustering of components C is employed, such that minimization criteria for choice of cluster may be applied combining:
  Average distance,
  Min/Max distance, and
  Ward approach minimizing the within cluster distance.
Independent components may then be identified and cluster elements may be allocated to bundles.

Referring now to the drawings, and more particularly to FIG. 1, there is shown a representation of the stepwise outline of the business process according to the invention. Product orders 110 go through a process of data collection of choices for each component 120, resulting in customer data of component choices 130. Customer data of component choices 130 then goes through a process of estimation of distances between pairs 140, resulting in a distance matrix 150. The distance matrix 150 goes through a process of hierarchical clustering 160, resulting in a dendrogram 170 representing a combination of clusters. The dendrogram 170 then goes through a process of bundle selection 180, resulting in option bundles 190.

Figure 2:
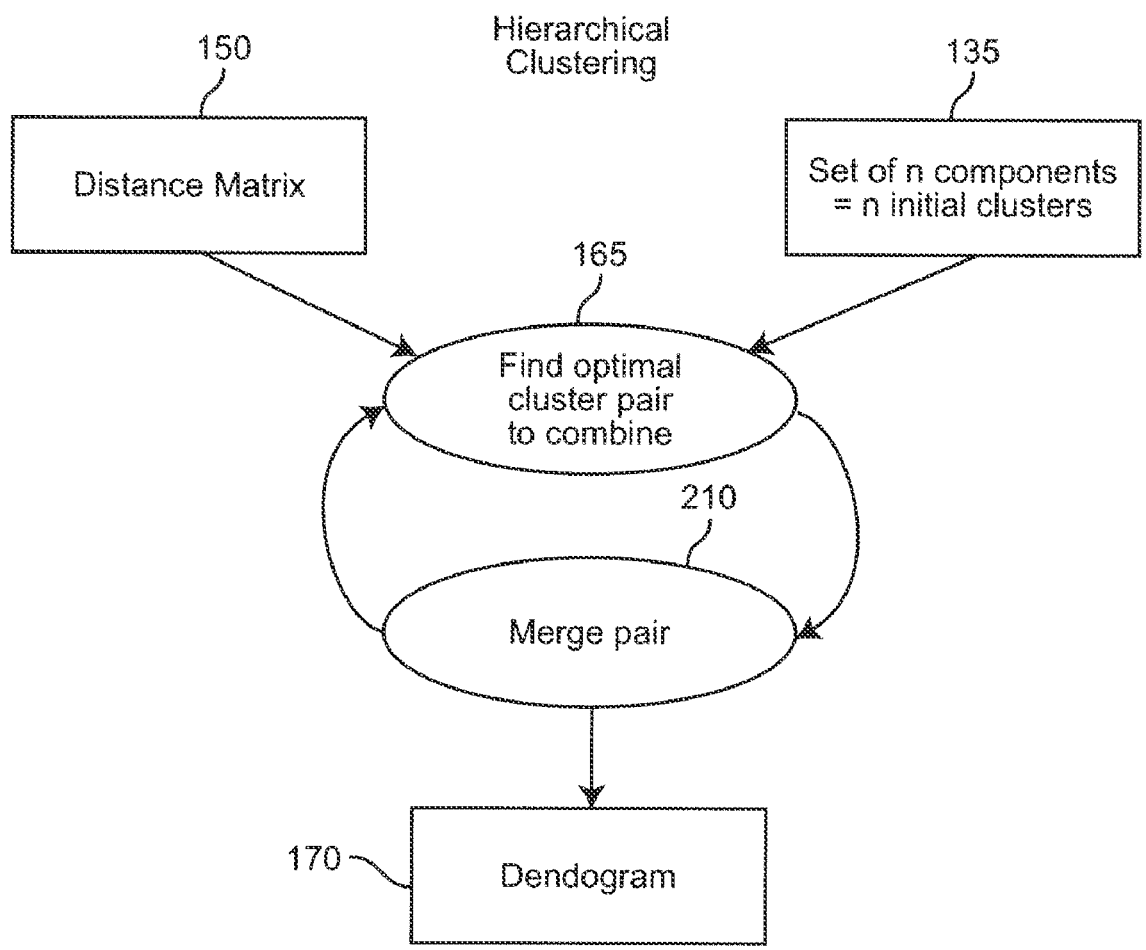
FIG. 2 provides a conceptual overview of hierarchical clustering according to the present invention.

FIG. 2 gives a conceptual overview of hierarchical clustering. Initially, each of the n product components will be assigned its own cluster and the algorithm will start with this initial set of n clusters 135. The algorithm uses the distance matrix 150 to choose an optimal pair of clusters 165 that may be combined. The algorithm adds then removes the two chosen clusters from the set and adds the new, bigger cluster, finishing once all components are joined into a single cluster 210. Each such step of combining two clusters is represented in a tree-like graph known as dendogram 170 as shown, for example, in FIGS. 3 and 4.

Figure 3:
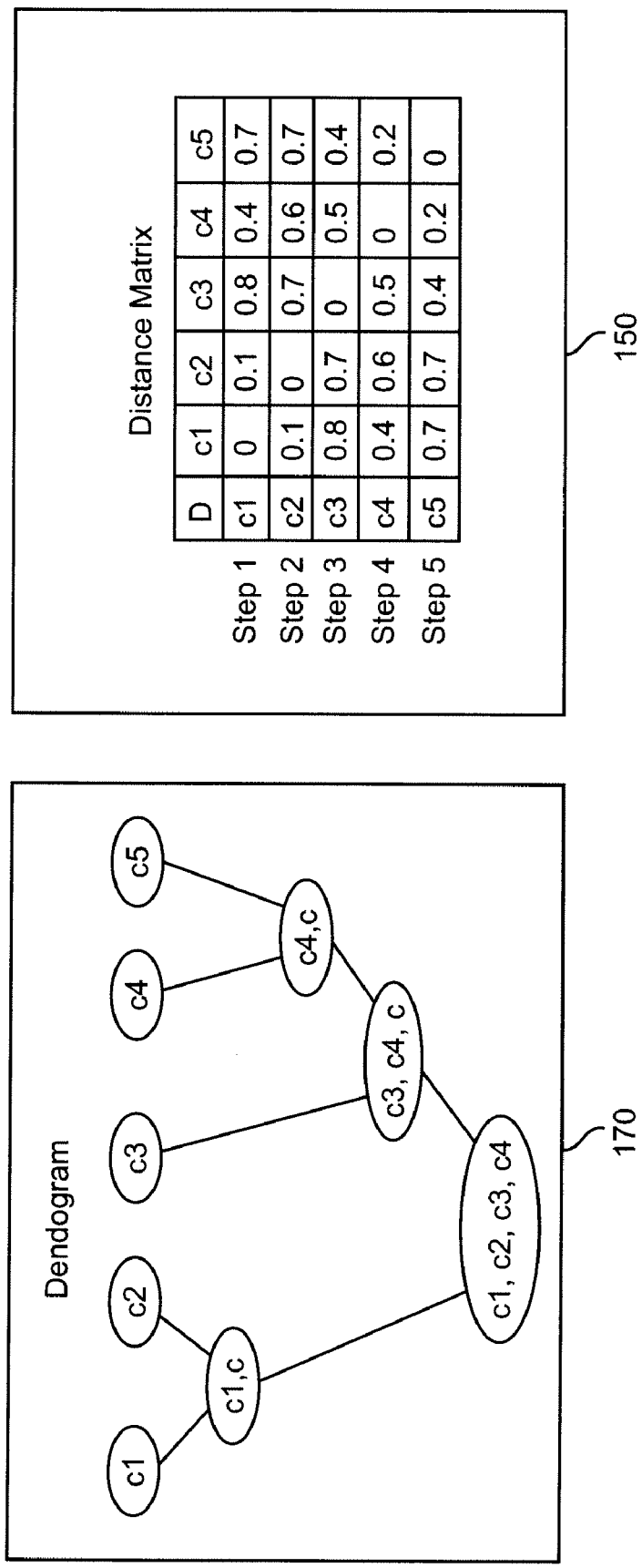
FIG. 3 shows detail of a dendrogram and of a distance matrix according to the present invention.

FIG. 3 shows detail of a dendrogram 170 consisting of 5 components with interdependence as recoded in a distance matrix 150. Detail is shown of the distance matrix 150 where, at step 1, each component represents one cluster. The two clusters with minimal distance are c1 and c2 and they get joined in step 2. In step 3, c4 and c5 are combined based on the small distance between them, step 4 adds c3 to the cluster (c4, c5) and finally all components are joined in step 5.

Figure 4:
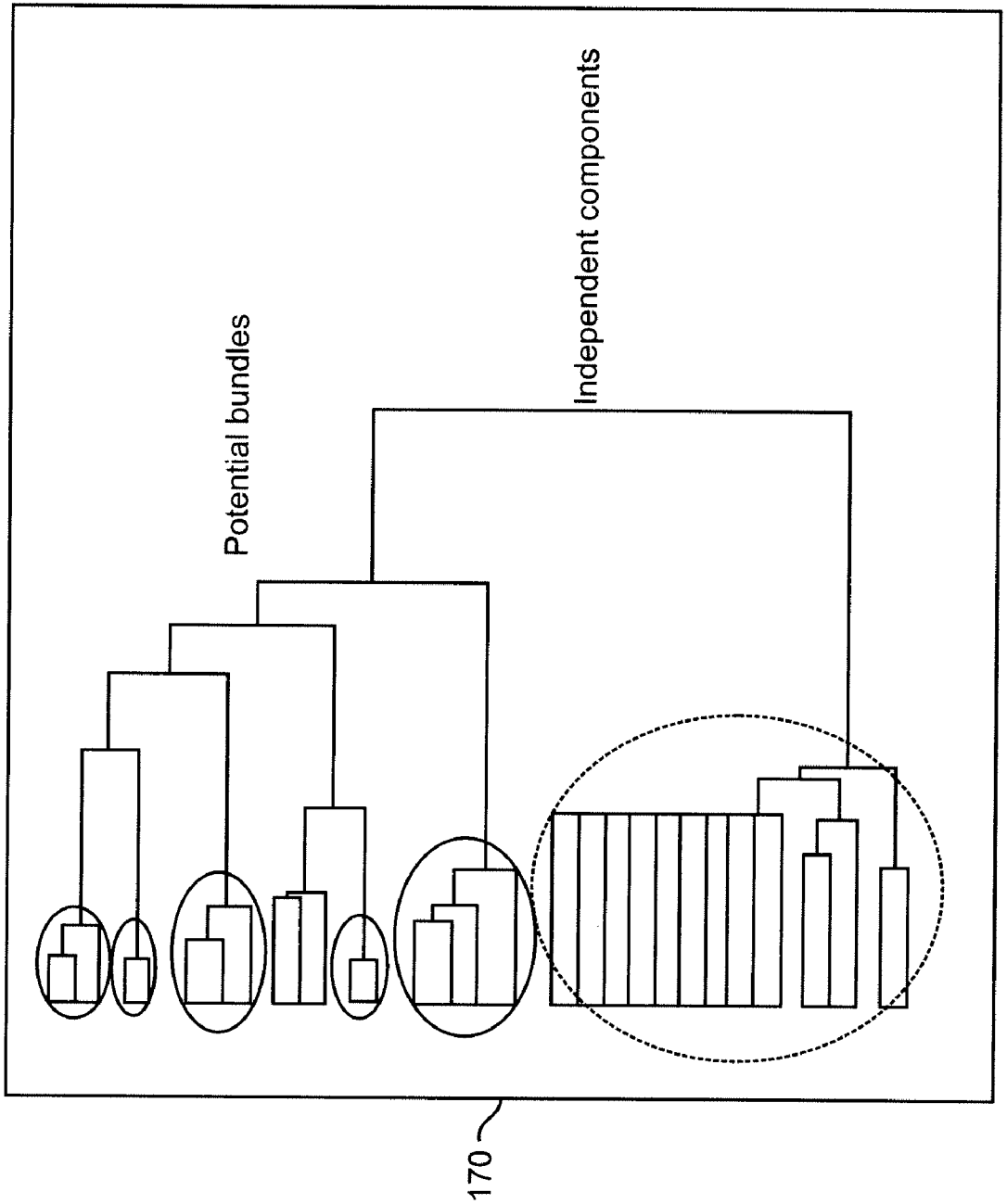
FIG. 4 shows detail of a dendrogram according to the present invention.

FIG. 4 shows detail of a dendrogram 170 in which identifies potential component bundles as well as a large set of independent components.

Figure 5:
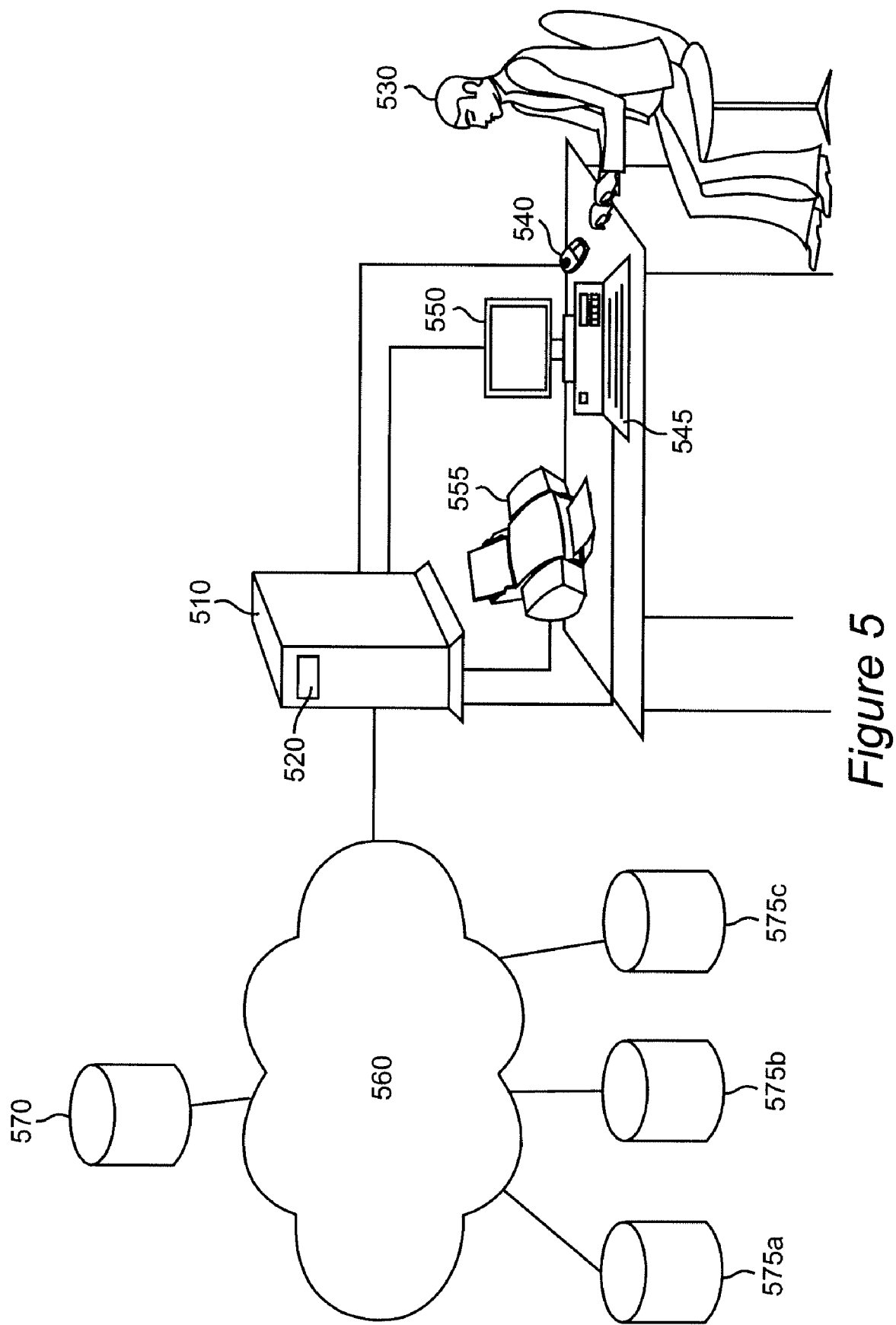
FIG. 5 shows an example of a system implemented with a machine-readable medium according the present invention, in which customer choice data is obtained over a network.

FIG. 5 shows an example of a system according the claimed invention, in which customer choice data is obtained over a network. A computer 510 has a machine-readable medium 520 for providing instructions. An operator 530 is able to provide input via a keyboard 540 or mouse 545, and the computer is able to provide output via a monitor 550 or a printer 555. The computer is connected to a network 560 to which is connected a database 570 from which the computer may obtain wholesale price data. Other data may be obtained from other databases 575*a*, 575*b*, and 575*c* connected to the network 560.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for customer-choice-based bundling of product options, comprising the steps of:
  using a computer to define one or a plurality of groups of product component options exhibiting strong customer choice interdependencies by
    collecting customer choice data of multiple customers relating to a plurality of product component options of a non-standardized good, wherein the customer choice data of multiple customers is collected from previous orders, wherein each customer choice comprises a component option of the good,
  grouping said product component options from the customer choice data of multiple customers as elements in one or a plurality of sets of product component options by computing distances between choice pairs of said product components and, based on said distances, determining the extent to which the probability of a choice pair deviates from the expected probability under a null hypothesis of independence, and
  determining one or a plurality of bundles of product component options by the application of said clustering approach; and generating as output one or a plurality of lists of clustered product component options comprising said one or a plurality of bundles of product component options, wherein the options in each bundle can be combined in a single configuration for manufacture of the good.

2. The method of claim 1, wherein the computer is connected to a network.

3. The method of claim 2, wherein the network is the Internet.

4. The method of claim 2, wherein said customer choice data is obtained from a database connected to said network.

5. A system for customer-choice-based bundling of product options, comprising:

a computer defining one or a plurality of groups of product component options exhibiting strong customer choice interdependencies by collecting customer choice data of multiple customers relating to a plurality of product component options of a non-standardized good, wherein the customer choice data of multiple customers is collected from previous orders, wherein each customer choice comprises a component option of the good, grouping said product component options from the customer choice data of multiple customers as elements in one or a plurality of sets of product component options by computing distances between choice pairs of said product component options and, based on said distances, determining the extent to which the probability of a choice pair deviates from the expected probability under a null hypothesis of independence, and determining one or a plurality of bundles of product component options by the application of said clustering approach; and generating as output one or a plurality of lists of clustered product component options comprising said one or a plurality of bundles of product component options, wherein the options in each bundle can be combined in a single configuration for manufacture of the good.

6. The system of claim 5, wherein the computer is connected to a network.

7. The system of claim 6, wherein the network is the Internet.

8. The system of claim 6, wherein said customer choice data is obtained from a database connected to said network.

9. A computer-readable medium for customer-choice-based bundling of product options, on which is provided:

instructions for using a computer to define one or a plurality of groups of product component options exhibiting strong customer choice interdependencies by collecting customer choice data of multiple customers relating to a plurality of product component options of a non-standardized good, wherein the customer choice data of multiple customers is collected from previous orders, wherein each customer choice comprises a component option of the good, grouping said product components from the customer choice data of multiple customers as elements in one or a plurality of sets of product component options by computing distances between choice pairs of said product component options and, based on said distances, determining the extent to which the probability of a choice pair deviates from the expected probability under a null hypothesis of independence, and determining one or a plurality of bundles of product component options by the application of said clustering approach; and generating as output one or a plurality of lists of clustered product component options comprising said one or a plurality of bundles of product component options, wherein the options in each bundle can be combined in a single configuration for manufacture of the good.

10. The machine readable medium of claim 9, wherein the computer is connected to a network.

11. The machine readable medium of claim 10, wherein the network is the Internet.

12. The machine readable medium of claim 11, wherein said customer choice data is obtained from a database connected to said network.

13. The method of claim 1, including hierarchical clustering in which initially each of the "n" product components is assigned to an own cluster for an initial set of "n" clusters, on which a distance matrix is used to choose an optimal pair of clusters to combine to form a new, bigger cluster of product components.

14. The method of claim 1, wherein the non-standardized good is a truck.

15. The method of claim 1, including determining at least a bundle that is an all-weather package.

16. The method of claim 1, including collecting data for at least truck color and truck upholstery color.

17. A method for customer-choice-based bundling of product options, comprising:

based on a collected set of customer choice data of multiple customers relating to a plurality of product component options of a non-standardized good, grouping said product components from the customer choice data as elements in one or a plurality of sets of product component options by computing distances between choice pairs of said product component options and, based on said distances, determining the extent to which the probability of a choice pair deviates from the expected probability under a null hypothesis of independence, wherein the grouping and the determining are performed by a computer; and determining, performed by the computer, one or a plurality of bundles of product component options by the application of said clustering approach; and generating as output one or a plurality of lists of clustered product component options comprising said one or a plurality of bundles of product component options, wherein the options in each bundle can be combined in a single configuration for manufacture of the good.

* * * * *